(12) United States Patent
Inoue et al.

(10) Patent No.: US 8,167,075 B2
(45) Date of Patent: *May 1, 2012

(54) AIR BAG SYSTEM

(75) Inventors: Michio Inoue, Aichi-ken (JP);
Shigeyuki Suzuki, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 147 days.

This patent is subject to a terminal disclaimer.

(21) Appl. No.: 12/654,086

(22) Filed: Dec. 10, 2009

(65) Prior Publication Data
US 2010/0148476 A1    Jun. 17, 2010

(30) Foreign Application Priority Data

Dec. 12, 2008  (JP) .................................. 2008-317299

(51) Int. Cl.
*B60R 21/34*  (2011.01)
(52) U.S. Cl. ................. 180/274; 280/730.1; 296/187.04
(58) Field of Classification Search .................. 180/274; 280/728.2, 730.1, 730.2, 743.1; 293/107; 296/187.04
See application file for complete search history.

(56) References Cited

U.S. PATENT DOCUMENTS

| | | | | |
|---|---|---|---|---|
| 5,477,390 A | * | 12/1995 | Boddy et al. | 359/841 |
| 6,182,782 B1 | * | 2/2001 | Matsuura et al. | 180/274 |
| 6,467,563 B1 | * | 10/2002 | Ryan et al. | 180/274 |
| 6,497,302 B2 | * | 12/2002 | Ryan | 180/274 |
| 6,883,631 B2 | * | 4/2005 | Hu et al. | 180/274 |
| 6,955,238 B2 | * | 10/2005 | Takimoto | 180/274 |
| 7,726,433 B2 | * | 6/2010 | Satou et al. | 180/274 |
| 2002/0014761 A1 | | 2/2002 | Miyasaka et al. | |

FOREIGN PATENT DOCUMENTS

| | | |
|---|---|---|
| JP | A-H07-108903 | 4/1995 |
| JP | A-2008-222110 | 9/2008 |

OTHER PUBLICATIONS

Notice of Allowance mailed Oct. 11, 2011 from the U.S. Patent Office in related U.S. Appl. No. 12/659,093.

* cited by examiner

*Primary Examiner* — Joseph Rocca
(74) *Attorney, Agent, or Firm* — Posz Law Group, PLC

(57) ABSTRACT

An air bag system includes an air bag which can cover a front surface side of a front pillar of a vehicle. The air bag includes an inflatable main body portion and a supporting inflatable portion. The inflatable main body portion covers a front surface of the front pillar when the air bag is inflated completely. The supporting inflatable portion stretches continuously from the inflation main body portion so as to extend towards an outside of the vehicle from the inflation main body portion and is disposed to be brought into abutment with an upper surface of a mirror main body of a door mirror which is in a usable position on a lower surface side so as to be supported thereon to thereby support the inflatable main body portion, when the air bag is inflated completely.

6 Claims, 12 Drawing Sheets

AIR BAG SYSTEM

BACKGROUND OF THE INVENTION

1. Field of the Invention

The present invention relates to an air bag system which includes an air bag capable of covering a front surface side of a front pillar of a vehicle.

2. Related Art

There are various types of conventional air bag systems which are arranged so that an air bag is inflated so as to cover a front surface side of a front pillar of a vehicle to thereby prevent a pedestrian from being flung directly against the front pillar when the vehicle is involved in a collision with the pedestrian.

In one of those air bag systems, a folded air bag is stowed in a recessed groove at a front surface side of a front pillar and is then covered with a resin garnish. When an inflator installed within the front pillar is activated to supply an inflation gas into the air bag therefrom, the air bag push opens the resin garnish and is deployed to be inflated so as to cover the front surface side of the front pillar (for example, refer to JP-A-7-108903).

In another air bag system, a folded air bag is stowed in a cowl below a rear end of a hood panel and when activated, the air bag is caused to project through a gap defined between the rear end of the hood panel and the cowl so that the air bag, which is now completely inflated, is disposed on a front surface side of a front pillar (for example, JP-A-2002-36986 and JP-A-2008-222110).

In the conventional air bag systems, however, there still exists room for improvement with respect to the lateral deviation of the air bag towards the outside of the vehicle when the air bag is inflated completely for receiving the pedestrian.

Namely, in the air bag system described in JP-A-7-108903, there is no disclosure or implication of a construction for supporting the air bag while suppressing the lateral deviation of the air bag when it is inflated completely. In the air bag system described in JP-A-2002-36986, the means for preventing the lateral deviation of the air bag is a stay which is disposed below the hood panel where the air bag is stowed. This stay is disposed on a lower end side of the air bag and is spaced so far apart from an upper end side of the air bag that the lateral deviation of the upper end side of the air bag towards the outside of the vehicle cannot be prevented accurately. Thus, there has been room for improvement with respect to an accurate suppression of the lateral deviation of the whole of the air bag.

Further, in the air bag system of JP-A-2008-222110, the air bag is designed to be bent in section when it is inflated completely so as to cover a front pillar and a front side window. However, there has been devised no countermeasure for preventing the lateral deviation of the air bag towards the outside of the vehicle.

In the event that the air bag deviates from the front surface side of the front pillar towards the outside of the vehicle, the air bag falls on the front side window side, whereby the front surface side of the front pillar, which needs to be covered by the air bag, is exposed largely.

SUMMARY OF THE INVENTION

The invention has been made with a view to solving the problems and an object thereof is to provide an air bag system in which a lateral deviation of an air bag towards an outside of a vehicle is suppressed when the air bag is inflated completely for receiving a pedestrian, so as to cover a front side of a front pillar accurately.

According to the invention, there is provided an air bag system comprising an air bag capable of covering a front surface side of a front pillar of a vehicle, the vehicle comprising a front side door installed at a rear side of the front pillar consecutively and having a side window positioned at a rear of the front pillar and a door mirror positioned in the vicinity of a front lower corner of the side window, the door mirror comprising a mount base which is mounted on the front side door and a mirror main body which is installed while being supported rotatably on the mount base at a proximal portion side thereof so as to be positioned in a foldable position where a distal end is positioned in proximity to the side window and a usable position where the distal end is positioned so as to project towards an outside of the vehicle, wherein the air bag is folded to be stowed in proximity to a front of the door mirror below the front pillar and comprises:

an inflatable main body portion which covers a front surface of the front pillar when completely inflated; and a supporting inflatable portion which stretches continuously from the inflatable main body portion so as to extend towards the outside of the vehicle from the inflatable main body portion and which is disposed so that a lower surface side is brought into abutment with an upper surface of the door mirror in the usable position so as to be supported thereon to thereby support the inflatable main body portion.

In the air bag system according to the invention, when activated, the air bag, which is folded to be stowed in proximity to the front side of the door mirror below the front pillar, is deployed to be inflated so as to cover the front surface of the front pillar. As this occurs, in the air bag, the inflatable main body portion covers the front surface of the front pillar, and the supporting inflatable portion, which is disposed to stretch continuously from the inflatable main body portion so as to extend from the inflatable main body portion towards the outside of the vehicle, is brought into abutment with the upper surface of the door mirror main body so as to be supported thereon. As this is happening, the vehicle is running and the mirror main body is in the usable position with the distal end extending towards the outside of the vehicle. Therefore, the upper surface of the mirror main body, with which a lower surface of the supporting inflatable portion is brought into abutment so as to be supported thereon, extends long towards the outside of the vehicle, and a sufficient reaction force can be secured to resist a pressing force acting on the supporting inflatable portion towards the outside of the vehicle by an area extending widely towards the outside of the vehicle. Because of this, for example, even when a pedestrian comes to interfere with the inflatable main body portion so as to push it from a windshield side to the outside of the vehicle, the supporting inflatable portion is supported on the upper surface of the mirror main body which extends long towards the outside of the vehicle and is prevented from moving. Thus, the supporting inflatable portion can support the inflatable main body portion so as to suppress a movement of the inflatable main body portion towards the outside of the vehicle accurately.

Furthermore, this supporting inflatable portion includes the lower surface which is supported on the upper surface of the mirror main body which extends towards the outside of the vehicle and is disposed in a portion which is spaced apart from the proximity to the front side of the door mirror below the front pillar which constitutes the stowage portion of the air bag, that is, an upper portion (a distal end side portion) which is spaced apart from a lower end (a front end) of the inflatable main body portion. This enables an accurate suppression of a lateral deviation of the inflatable main body portion towards the outside of the vehicle not by the portion in proximity to the lower end of the inflatable main body portion but by a distal end side (a rear end side) which lies apart from the lower end of the inflatable main body portion, in other words, a portion which is spaced apart from the lower end of the inflatable main body portion so as to easily resist a deviating movement of the inflatable main body portion, that is, the portion of the supporting inflatable portion that is supported on the upper surface of the mirror main body.

Consequently, in the air bag system according to the invention, the lateral deviation of the air bag towards the outside of the vehicle is suppressed when the air bag is inflated completely to receive a pedestrian, so as to cover the front surface of the front pillar accurately, thereby making it possible to preferably protect the pedestrian from the front pillar.

In the air bag system according to the invention, the supporting inflatable portion preferably fits in a gap defined between the mirror main body and the front side door of the vehicle. In addition, the air bag may be folded to be stowed in the front side door in a position which lies in proximity to a front side of the door mirror or may be folded to be stowed in a portion of a body of the vehicle which is positioned at a front of the front side door and in proximity to the front side of the door mirror. Incidentally, when the air bag is stowed in the front side door, the air bag is desirably stowed in an area around the mount base of the door mirror where a stowage space is easily secured. When the air bag is stowed in a portion on the body of the vehicle, compared with the case in which the air bag is stowed in an interior of the front side door where space available for the air bag is limited, the degree of freedom in layout of an inflator for supplying an inflation gas is enhanced, thereby making it possible to fixedly install the inflator in a stable fashion.

DETAILED DESCRIPTION OF THE PREFERRED EMBODIMENTS

Figure 1:
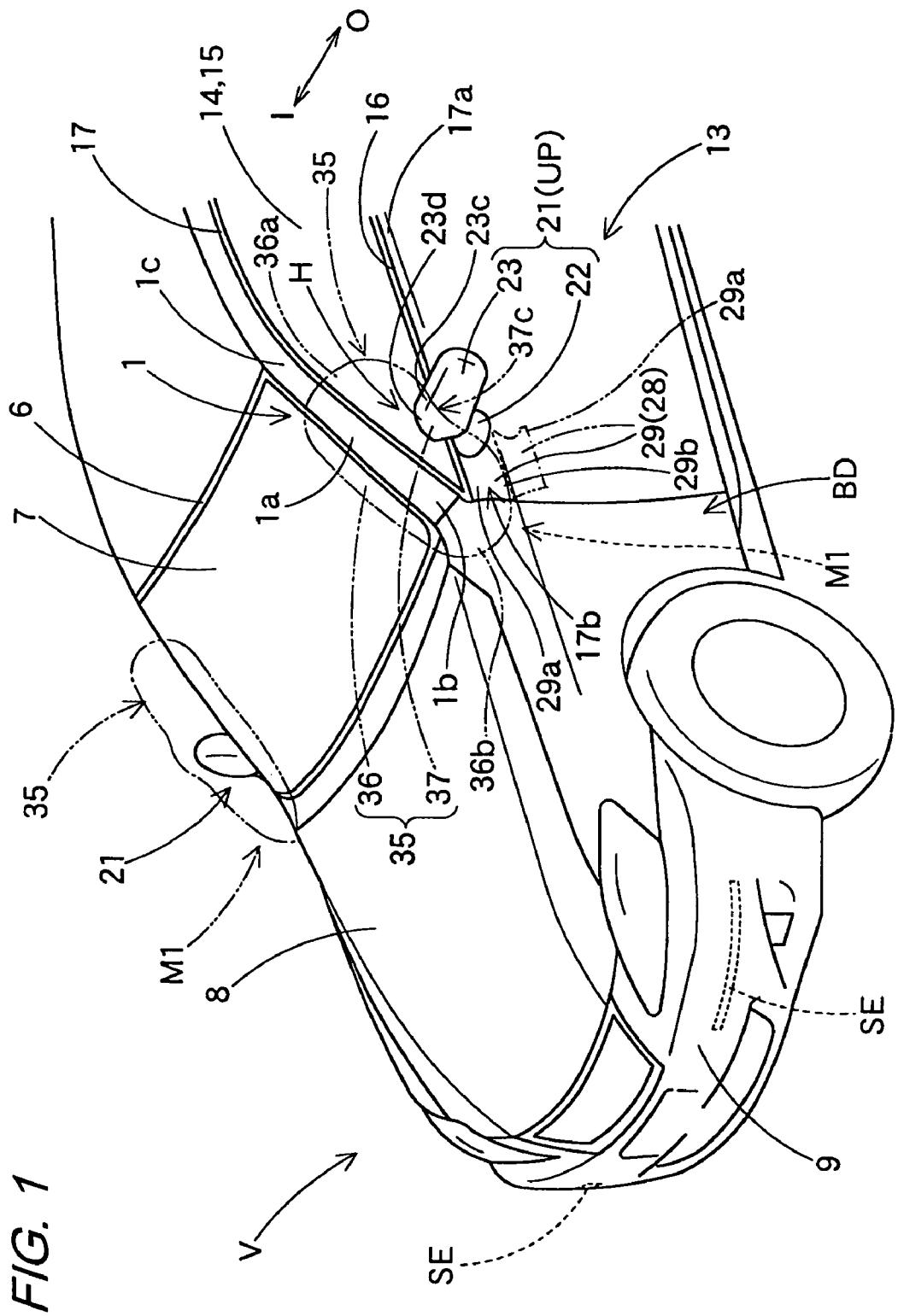
FIG. 1 is a perspective view of a vehicle showing an installation of an air bag system of a first embodiment according to the invention, with an air bag which is inflated completely indicated by a chain double-dashed line.
Figure 2:
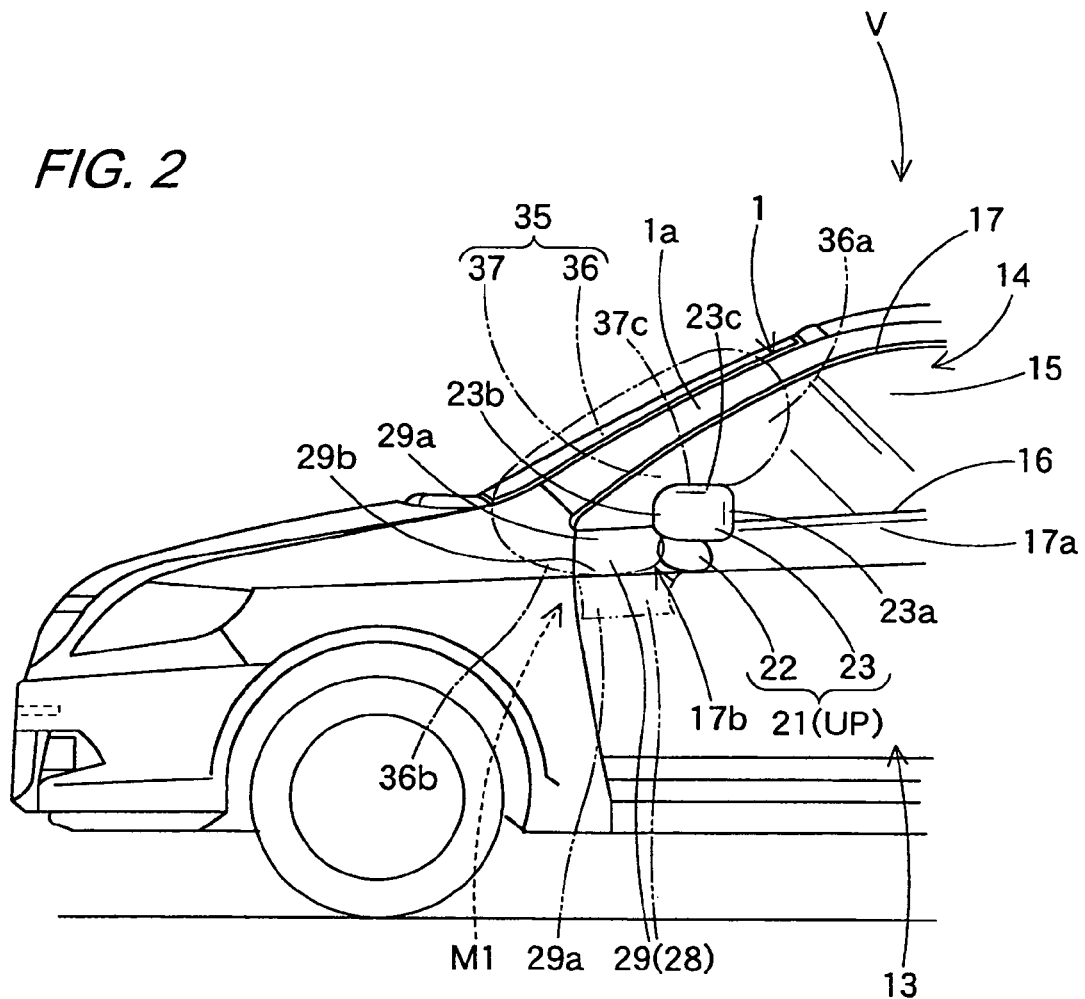
FIG. 2 is a side view of the vehicle showing the installation of the air bag system of the first embodiment.
Figure 3:
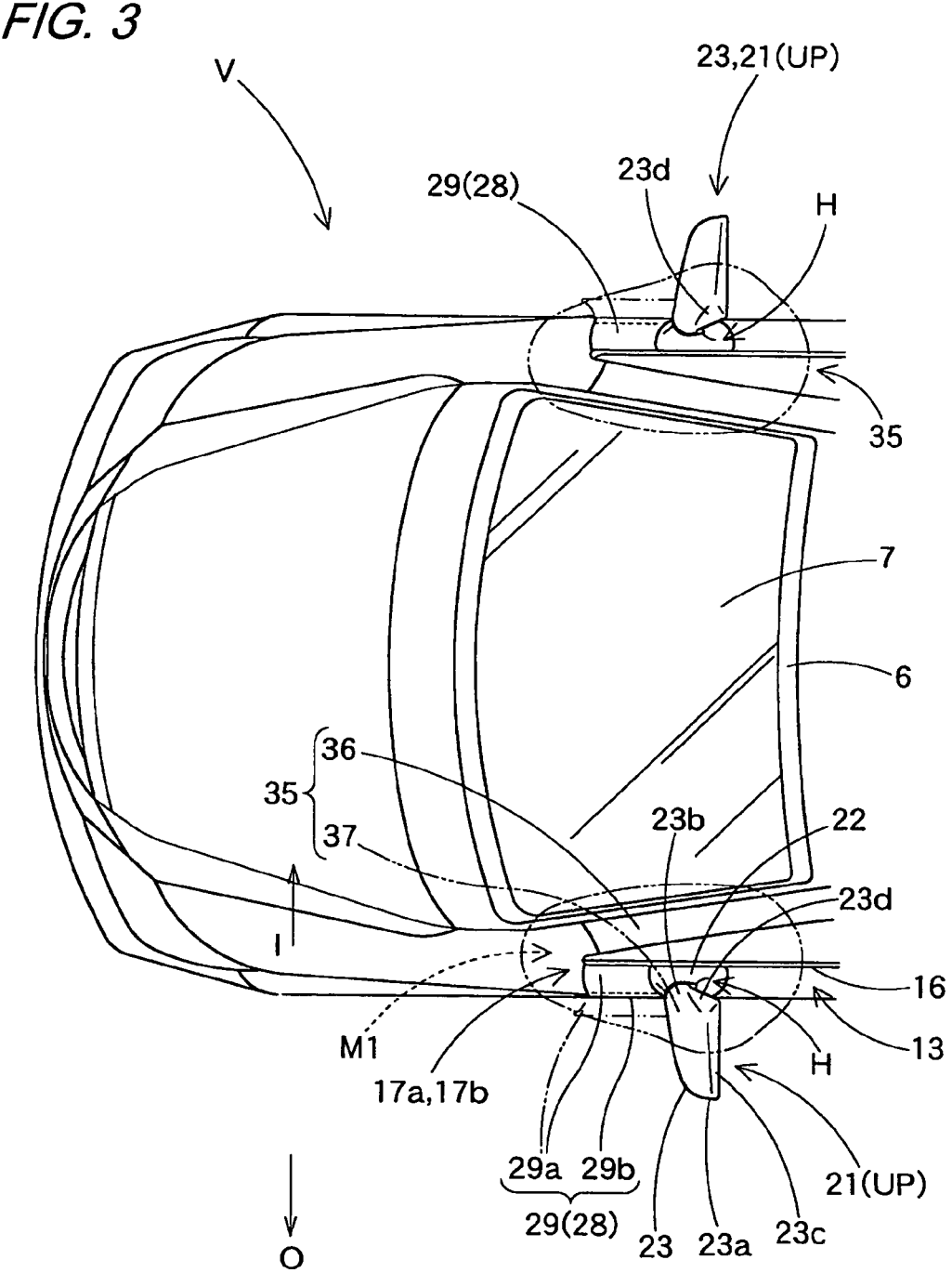
FIG. 3 is a plan view of the vehicle showing the installation of the air bag system of the first embodiment.

Hereinafter, an embodiment of the invention will be described based on the drawings. As is shown in FIGS. 1 to 4, an air bag system M1 of a first embodiment is installed in each of front side doors 13 which are disposed at a rear side of left and right front pillars 1 of a vehicle V consecutively. Each of the left and right front pillars 1 includes an outer panel 2, an inner panel 3 and a reinforcement 4 disposed between the outer panel 2 and the inner panel 3, and these panels are made of sheet steel. Thus, the front pillars 1 are provided while being given a high rigidity as a constituent member of the vehicle V (refer to FIG. 4). In FIG. 1, a member denoted by reference 6 is a window frame rubber, a member denoted by reference numeral 7 is a windshield, a member denoted by reference numeral 8 is a hood panel, and a member denoted by reference numeral 9 is a front bumper.

When used in this specification, directions denoted by such words as front, rear, up, down, left and right should be understood to correspond to front, rear, up, down, left and right directions viewed when the vehicle V is running straight ahead.

In each embodiment, although an air bag system will be described which includes an air bag for covering a front surface 1a side of the left-hand front pillar 1, an air bag system which includes an air bag for covering a front surface 1a side of the right-hand front pillar 1 is laterally symmetrical in configuration with the air bag system for the left-hand front pillar 1, and therefore, the description of the air bag system for the right-hand front pillar 1 will be omitted here.

The front side door 13, in which the air bag system M1 of the first embodiment is installed, includes a side window 14 which is positioned at a rear of the front pillar 1, and an air bag 35 is stowed and held in a portion of the front side door 13 which lies in proximity to the front pillar 1 at the lever of a belt line (a lower edge of the side window 14) so as to be deployed to be inflated. In other words, the air bag 35 is disposed in proximity to a front end 17b of a lower edge portion 17a of a window frame portion 17 on a circumference of a door glass 15 which makes up the side window 14 of the front side door 13 and is installed in a mounting area 25 in proximity to a mount base 22 of a door mirror 21 (specifically, a front side of a pivotally supporting portion 22a of the mount base 22 which supports a mirror main body 23 rotatably) (refer to FIG. 4).

The door mirror 21 includes the mount base 22 which is mounted in proximity to the front end 17b of the lower edge portion 17a of the window frame portion 17 of the front side door 13 and the mirror main body 23 which is mounted rotatably on an upper surface side of the mount base 22. The mirror main body 23 is provided with a proximal portion 23b side supported rotatably at the pivotally supporting portion 22a of the mount base 22 so as to be disposed in a foldable position HP where a distal end 23a side which extends from the proximal portion 23b side is positioned in close proximity to the side window 14 and a usable position UP where the distal end 23a side which extends from the proximal portion 23 side is allowed to project towards an outside of the vehicle O. When disposed in the usable position UP, the mirror main body 23 takes a form in which an upper surface 23c extends long towards the outside of the vehicle O, whereby a triangular gap H, which so looks when viewed from the front, is defined between the side window 14 and an inner surface 23d (refer to FIG. 6).

The air bag system M1 of the first embodiment includes the air bag 35 which is flexible and is formed into a bag-like shape, an inflator 31 for supplying an inflation gas into the air bag 35, an air bag cover 28 which covers the air bag 35 which is folded while allowing it to project outwards and a retainer 32.

Figure 4:
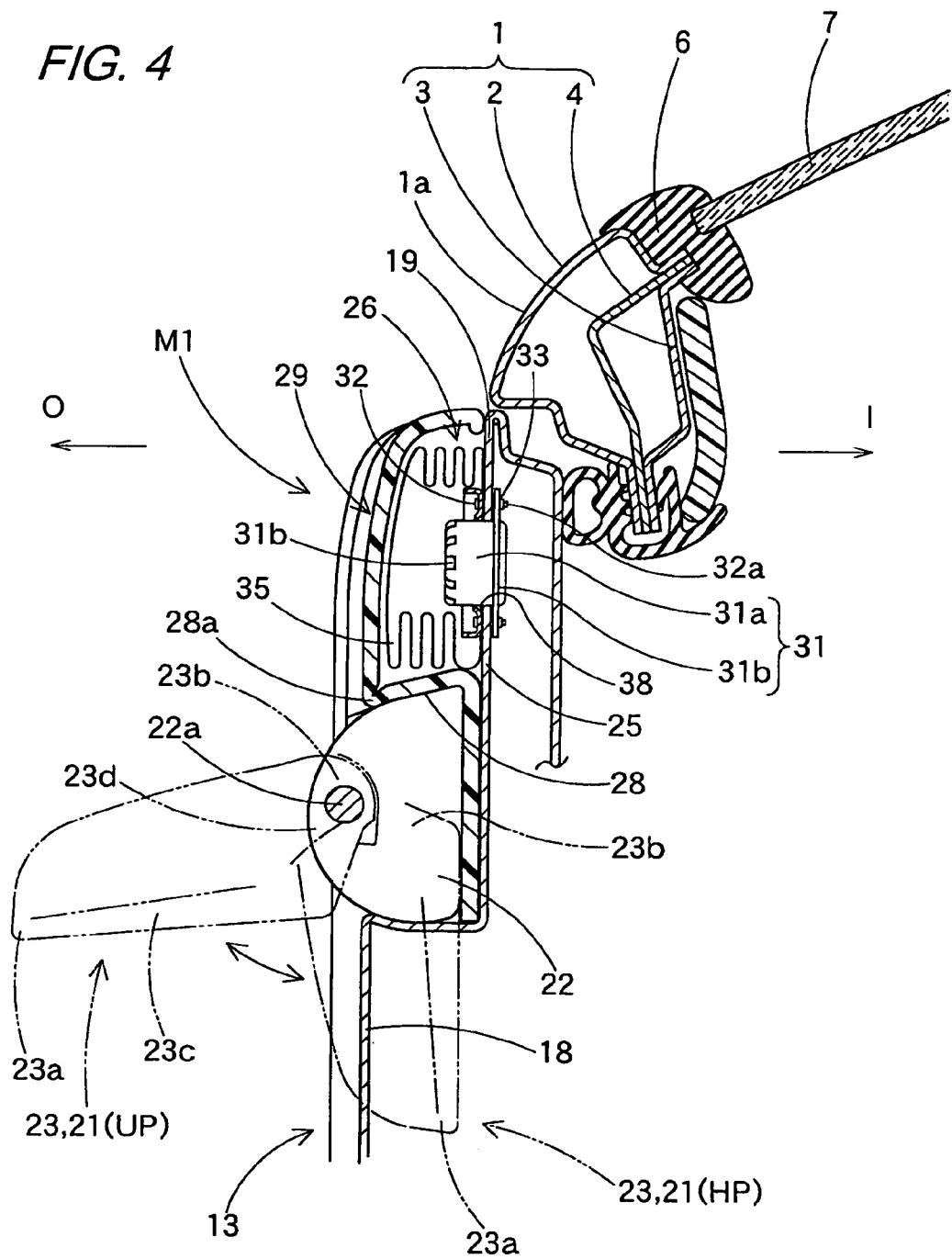
FIG. 4 is a schematic horizontal sectional view showing the installation of the air bag system of the first embodiment.

The air bag cover 28 includes a door portion 29 which is pushed to open towards the outside of the vehicle O when the air bag 35 is inflated, and a thin rupture anticipated portion 28a is formed along a circumference of the door portion 29 so that the door portion 29 is ruptured along the rupture anticipated portion 28a by a pressing force exerted by the air bag 35 to thereby be opened (refer to FIG. 4). This door portion 29 is connected to a portion of a panel portion 19, which is made of sheet metal, of the front side door 13 which lies in the mounting area 25 at a lower edge 29b side to thereby be supported thereon. When pushed to open, the door portion 29 opens so that an upper edge 29a side rotates towards the outside of the vehicle O and eventually downwards. The panel portion 19 is provided so as to stretch continuously from an outer panel 18 of the front side door 13.

As is shown in FIG. 4, the inflator 31 includes a cylindrical main body 31a which has a plurality of gas outlet ports 31b from which an inflation gas is discharged and a flange portion 31c which is fixedly attached to the mounting area 25 of the panel portion 19 of the front side door 13. Through holes, not shown, are formed in the flange portion 31c through which a plurality of bolts 32a which extend from the retainer 32 are put. By an activation signal being inputted thereinto from a predetermined air bag activation circuit, the inflator 31 discharges the inflation gas from the gas outlet ports so that the inflation gas is supplied into the air bag 35. The air bag activation circuit is disposed in the front bumper 9 of the vehicle V, and when a signal from a sensor SE which can detect a collision with a pedestrian is inputted thereinto, the air bag activation circuit activates the inflator 31.

The retainer 32 has a substantially quadrangular ring shape and is made of sheet metal. The retainer 32 includes the bolts 32a which extend towards an inside of the vehicle I in proximity to four corners thereof. By the respective bolts 32a being put through mounting holes 39 in the air bag 35, through holes, not shown, in the mounting area 25 and the through holes, not shown, in the flange portion 31c of the inflator 31 so as to be screwed therein, the retainer 32 fixedly mounts the air bag 35 and the inflator 31 on the mounting area 25.

Figure 5:
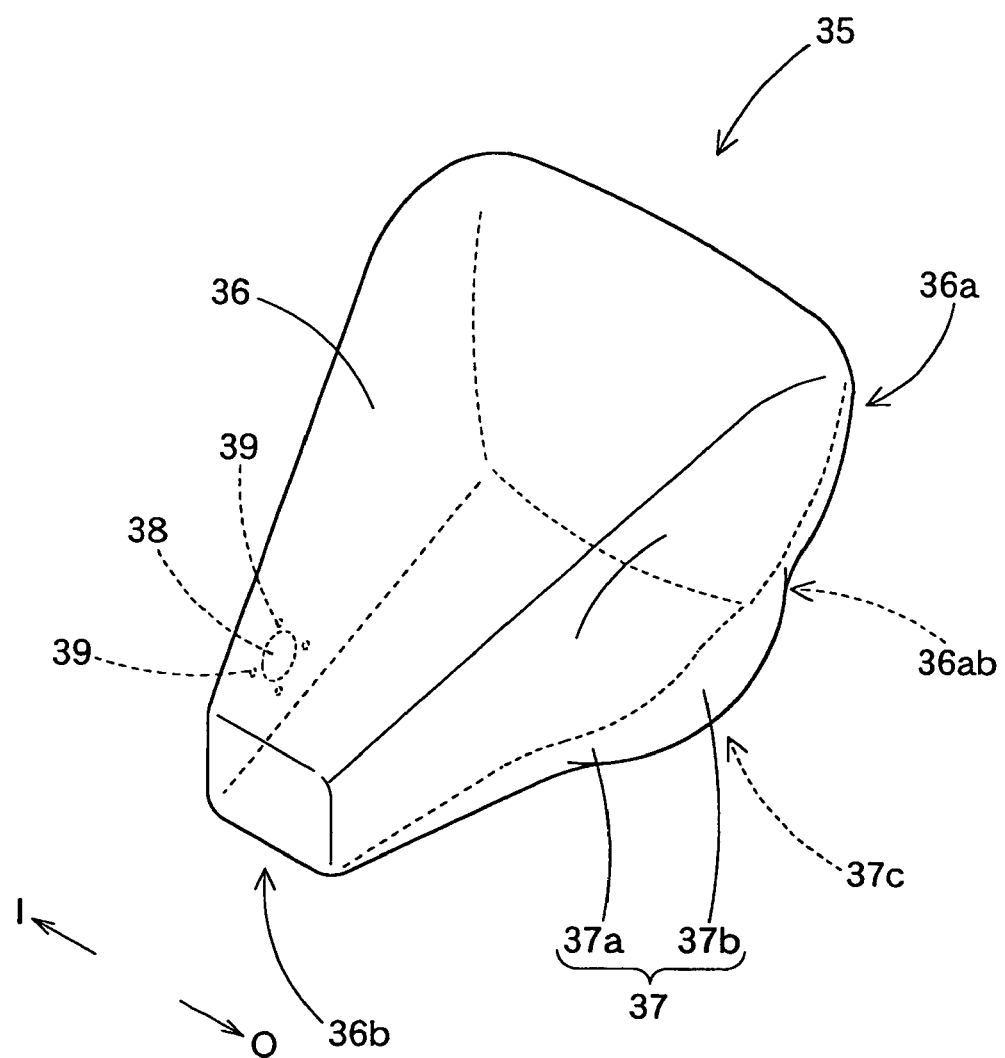
FIG. 5 is a perspective view showing a completely inflated condition of the air bag alone which is used for the air bag system of the first embodiment.
Figure 6:
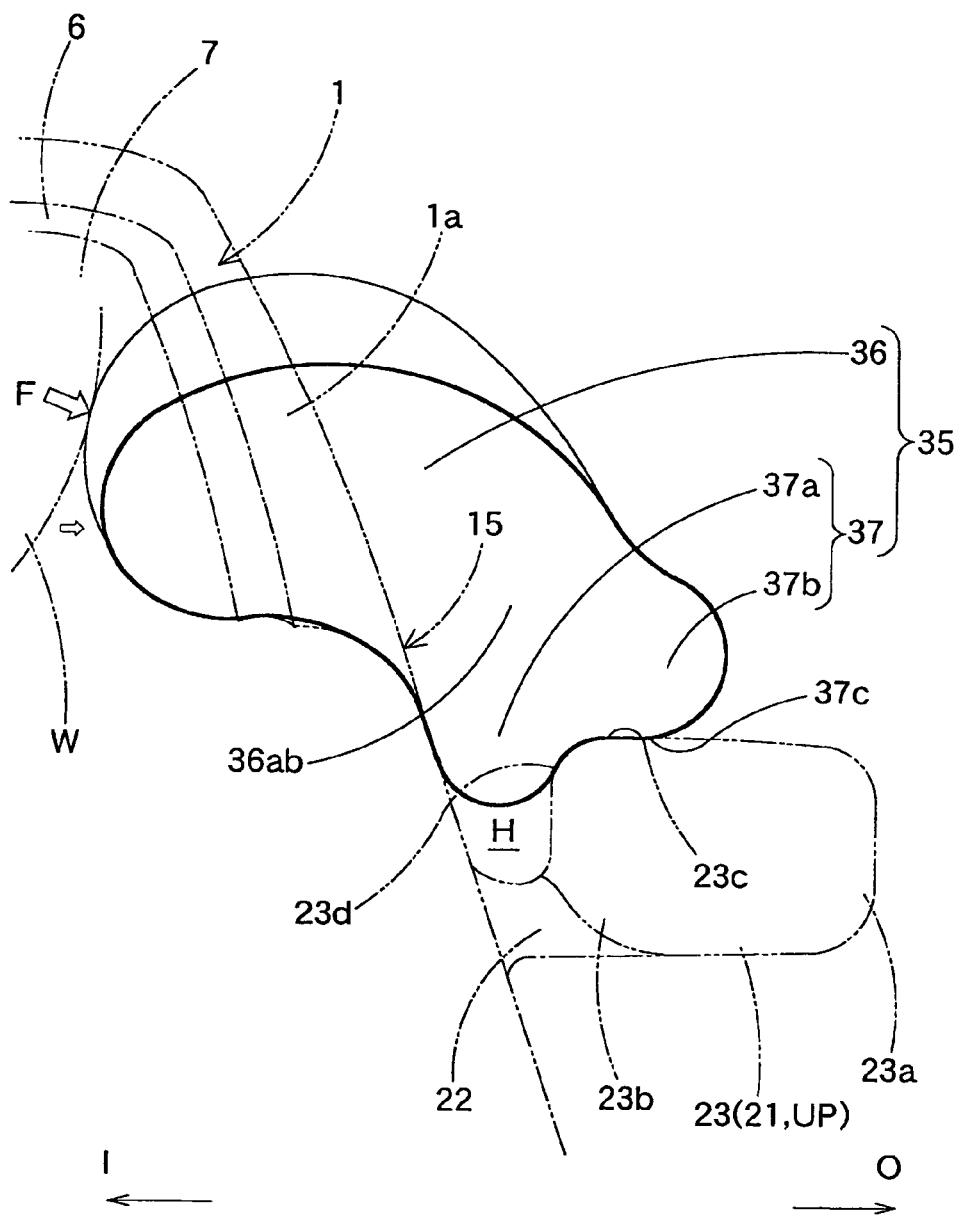
FIG. 6 is a schematic vertical sectional view of the air bag which is inflated when the air bag system of the first embodiment is activated which is taken along a left-right direction in proximity to a door mirror.
Figure 7:
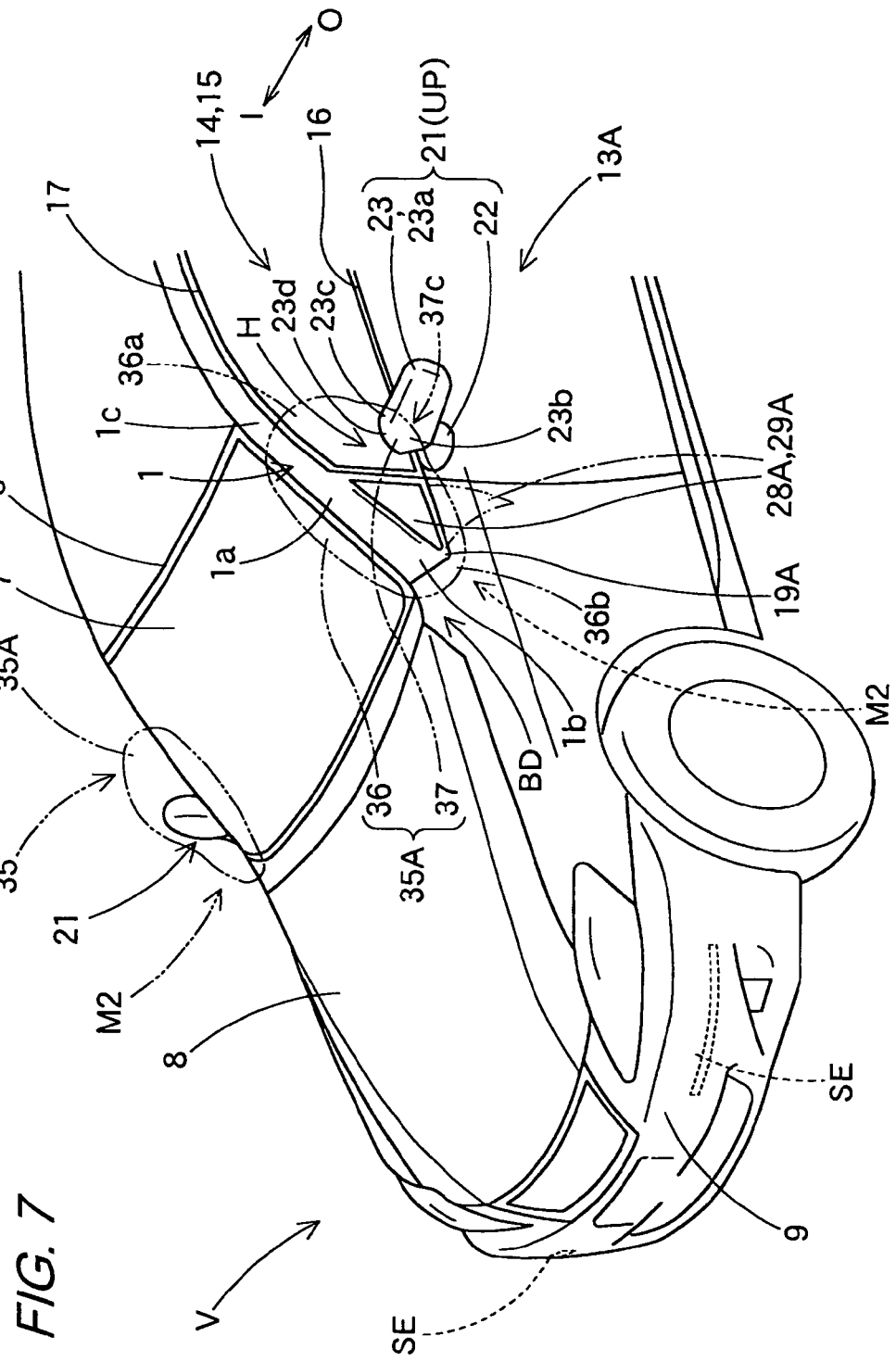
FIG. 7 is a perspective view of a vehicle showing an installation of an air bag system of a second embodiment according to the invention, with an air bag which is inflated completely indicated by a chain double-dashed line.
Figure 8:
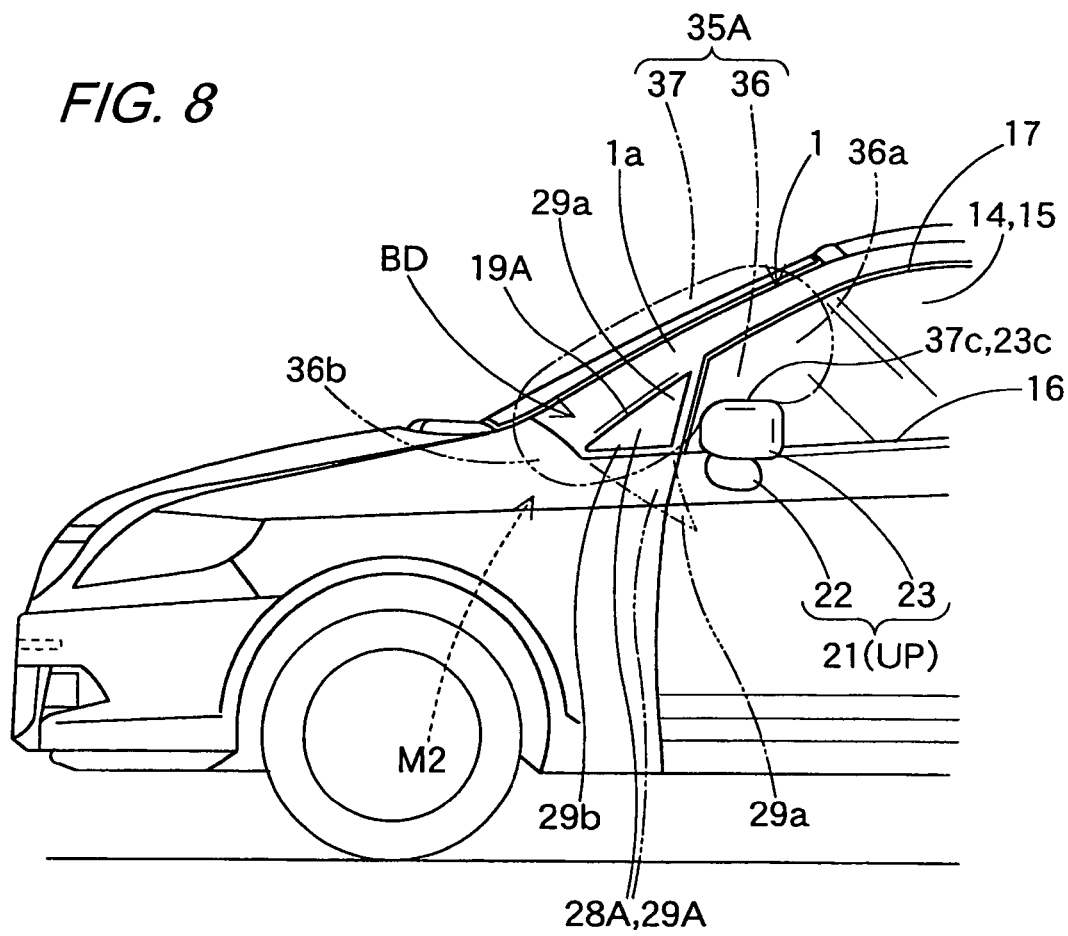
FIG. 8 is a side view of the vehicle showing the installation of the air bag system of the second embodiment.
Figure 9:
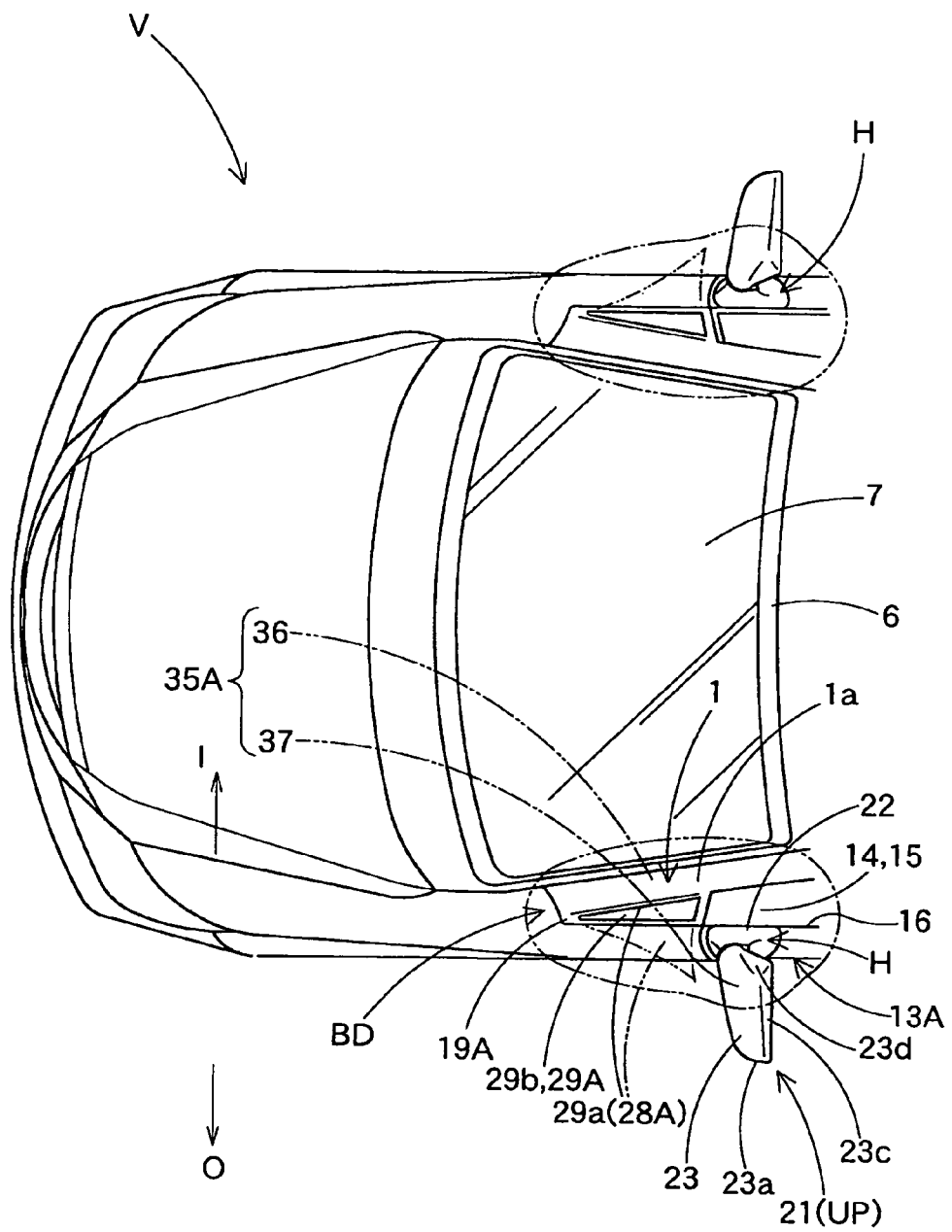
FIG. 9 is a plan view of the vehicle showing the installation of the air bag system of the second embodiment.
Figure 10:
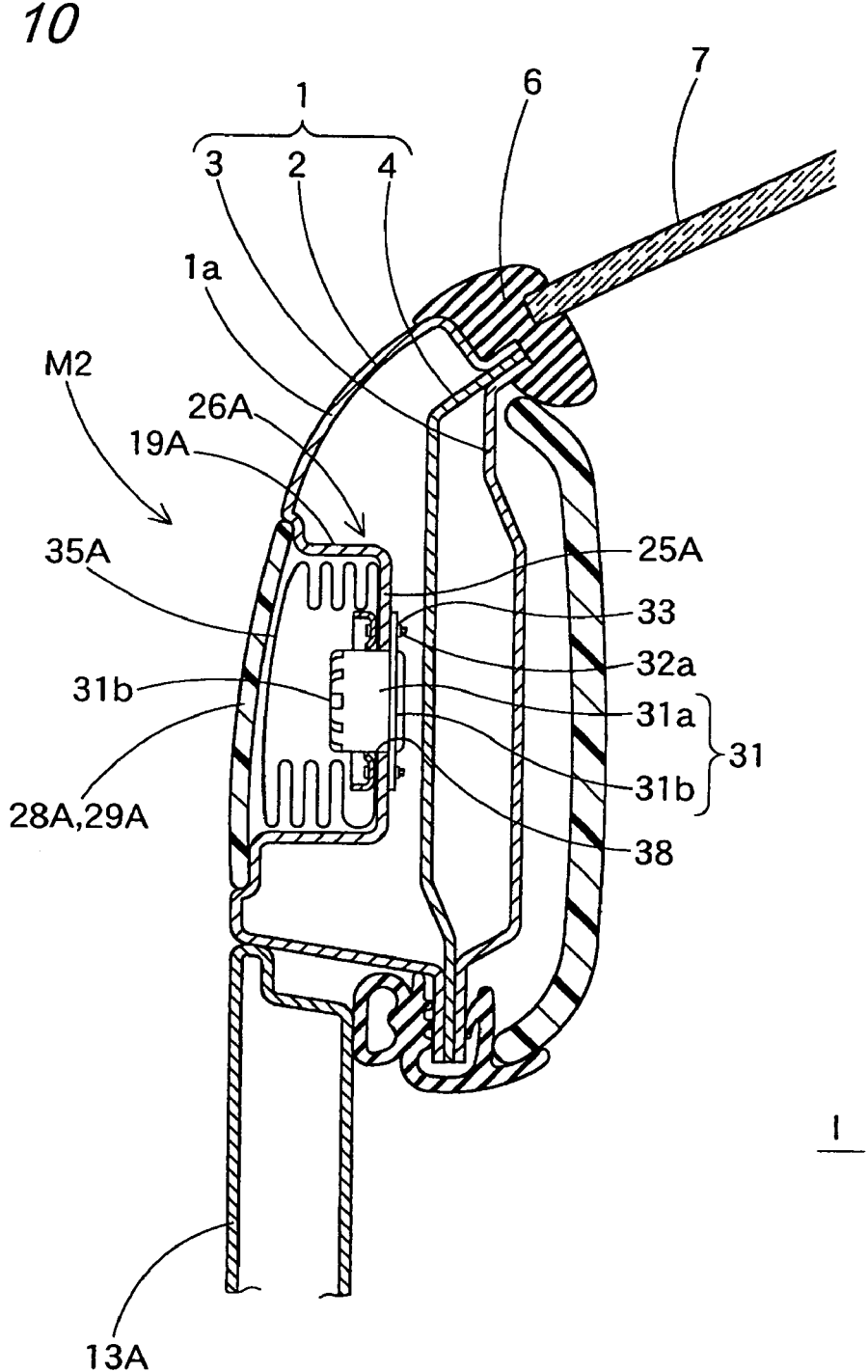
FIG. 10 is a schematic horizontal sectional view showing the installation of the air bag system of the second embodiment.

As is shown in FIGS. 1, 5, 6, the air bag 35 is formed into a bag shape from a woven fabric of polyester or polyamide and includes an inflatable main body portion 36 which covers a front surface 1a of the front pillar 1 and a supporting inflatable portion 37 which stretches continuously from the inflatable main body portion 36 so as to extend towards the outside of the vehicle O from the inflatable main body portion 36, when the air bag 35 is inflated completely. A circular opening 38 into which the main body 31a of the inflator 31 can be inserted is formed on a side of a lower end 36b side of the inflatable main body portion 36 which faces the inside of the vehicle I. In addition, the mounting holes 39 through which the respective bolts 32a of the retainer 32 can be inserted are formed on a periphery of the opening 38.

The supporting inflatable portion 37 is disposed to extend towards the outside of the vehicle O from a position on the inflatable main body portion 36 which lies in proximity to a side of a lower edge 36ab of an upper end 36a side which faces the outside of the vehicle O, when the air bag 35 is completely inflated on the vehicle V. When the air bag 35 is inflated completely, the supporting inflatable portion 37 is disposed so that a lower surface 37c is brought into abutment with the upper surface 23c of the mirror main body 23 in the usable position UP so as to be supported thereon to thereby support the inflatable main body portion 36. To describe this more specifically, the supporting inflatable portion 37 includes an inner portion 37a which lies to face the inner side of the vehicle I which is closer to the inflatable main body portion 36 and an outer portion 37b which lies to face the outside of the vehicle O and is set such that the portion of the supporting inflatable portion 37 which abuts with the upper surface 23c of the mirror main body 23 to thereby be supported thereon is referred to as the outer portion 37c and the inner portion 37a fits in the gap H defined between the door glass 15 of the side window 14 and the mirror main body 23. Consequently, when the air bag 35 is inflated completely, the supporting inflatable portion 37 is designed to fit in the gap H defined between the mirror main body 23 and the front side door 13.

In the air bag system M1 of the first embodiment, when the inflator 31 is activated by a signal from the air bag activation circuit after the air bag system M1 is installed in the vehicle V, the inflation gas is discharged from the gas outlet ports of the inflator 31, and the air bag 35 is inflated by the inflation gas. Then, as is shown in FIGS. 1, 6, the air bag 35 push opens the door portion 29 of the air bag cover 28 and is then deployed to be inflated from a lower end 1b side, which lies on a stowage portion 26 side, towards an upper end 1c side of the front pillar 1, so as to cover the front surface 1a of the front pillar 1. As this occurs, in the air bag 35, the inflatable main body portion 36 covers the front surface 1a of the front pillar 1, and the supporting inflatable portion 37, which is disposed to stretch continuously from the inflatable main body portion 36 so as to extend from the inflatable main body portion 36 towards the outside of the vehicle O, is brought into abutment with the upper surface 23c of the door mirror main body 23 so as to be supported thereon. As this is happening, the vehicle V is running and the mirror main body 23 is in the usable position UP with the distal end 23a extending towards the outside of the vehicle O. Therefore, the upper surface 23c of the mirror main body 23, with which the lower surface 37c of the supporting inflatable portion 37 is brought into abutment so as to be supported thereon, extends long towards the outside of the vehicle O, and a sufficient reaction force can be secured to resist the pressing force F acting on the supporting inflatable portion 37 towards the outside of the vehicle O by an area extending widely towards the outside of the vehicle O. Because of this, for example, even when a pedestrian W comes to interfere with the inflatable main body portion 36 so as to push it from the windshield 7 side to the outside of the vehicle O, the supporting inflatable portion 37 is supported on the upper surface 23c of the mirror main body 23 which extends long towards the outside of the vehicle O and is prevented from moving. Thus, the supporting inflatable portion 37 can support the inflatable main body portion 36 so as to suppress a movement of the inflatable main body portion 36 towards the outside of the vehicle accurately.

Furthermore, this supporting inflatable portion 37 includes the lower surface which is supported on the upper surface 23c of the mirror main body 23 which extends towards the outside of the vehicle O and is disposed in a portion which is spaced apart from the proximity to the front side of the door mirror 21 below the front pillar 1 which constitutes the stowage portion 26 of the air bag 35, that is, the upper end 36a side of the upper portion (the distal end side portion) which is spaced apart from the lower end (the front end) of the inflatable main body portion 36. This enables an accurate suppression of a lateral deviation of the inflatable main body portion 36 towards the outside of the vehicle O not by the portion in proximity to the lower end 36b of the inflatable main body portion 36 but by the distal end (the upper end or rear end) 36a side which lies apart from the lower end 36b of the inflatable main body portion 36, in other words, a portion which is spaced apart from the lower end 36b of the inflatable main body portion 36 so as to easily resist a deviating movement of the inflatable main body portion, that is, the portion (lower surface) 37c of the supporting inflatable portion 37 that is supported on the upper surface 23c of the mirror main body 23.

Consequently, in the air bag system M1 of the first embodiment, the lateral deviation of the air bag 35 towards the outside of the vehicle O is suppressed when the air bag 25 is inflated completely to receive the pedestrian W, so as to cover the front surface 1a of the front pillar 1 accurately, thereby making it possible to preferably protect the pedestrian W from the front pillar 1.

Further, in the first embodiment, when the air bag 35 is inflated completely, the supporting inflatable portion 37 is set to fit the inner portion 37a in the gap H defined between the door glass 15 of the side window 14 and the inner surface 23d off the mirror main body 23 from above (refer to FIG. 6). Thus, even in the event that the inflatable main body portion 36 attempts to deviate in the direction of the outside of the vehicle O or the inside of the vehicle I as along a horizontal direction, the inner portion 37a is restricted with respect to its position by the inner surface 23d of the mirror main body 23 or the door glass 15, whereby the movement thereof is suppressed. Because of this, the lateral deviation of the inflatable main body portion 36 towards the outside O or inside I of the vehicle can be prevented more accurately.

In the first embodiment, while the air bag 35 is folded and stowed in the stowage portion 26 of the front side door 13 in proximity to the front side of the door mirror 21, as is described in an air bag system M2 of a second embodiment shown in FIGS. 7 to 12, an air bag 35A may be folded and stowed in a portion of a body BD of a vehicle V which is positioned in front of a front side door 13A and in proximity to a front side of a door mirror 21 and is separated from the front side door 13A.

In the air bag system M2 of the second embodiment, a stowage portion 26 for the air bag 35A and an inflator 31 is disposed in a panel portion 19A on an outside of the vehicle O which lies in proximity to a lower portion of a front pillar 1 at a front side of a window frame portion 17 of the front side door 13A. This panel portion 19A is disposed to stretch continuously from an outer panel 2 of the front pillar 1 and a portion of the panel portion 19 which lies at the front side of the window frame portion 17 is referred to as a mounting area 25 of the air bag system M2.

The air bag system M2 of the second embodiment includes the air bag 35A which is flexible and is formed into a bag-like shape, an inflator 31 for supplying an inflation gas into the air bag 35A, an air bag cover 28A which covers the air bag 35A which is folded while allowing it to project outwards and a retainer 32. Note that the inflator 31 and the retainer 32 are similar to those of the first embodiment, and hence, the description thereof will be omitted here.

The air bag cover 28A is designed to be pushed by the air bag 35A when it is inflated to thereby be opened entirely towards the outside of the vehicle O as a door portion 29A. The air bag cover 28A is connected to the portion of the panel portion 19A where the mounting area 25 resides on a lower edge 29b side thereof so as to be supported thereon, and when it is opened, the air bag cover 28A opens with the upper edge 29a side rotating to the outside of the vehicle O and eventually downwards.

Figure 11:
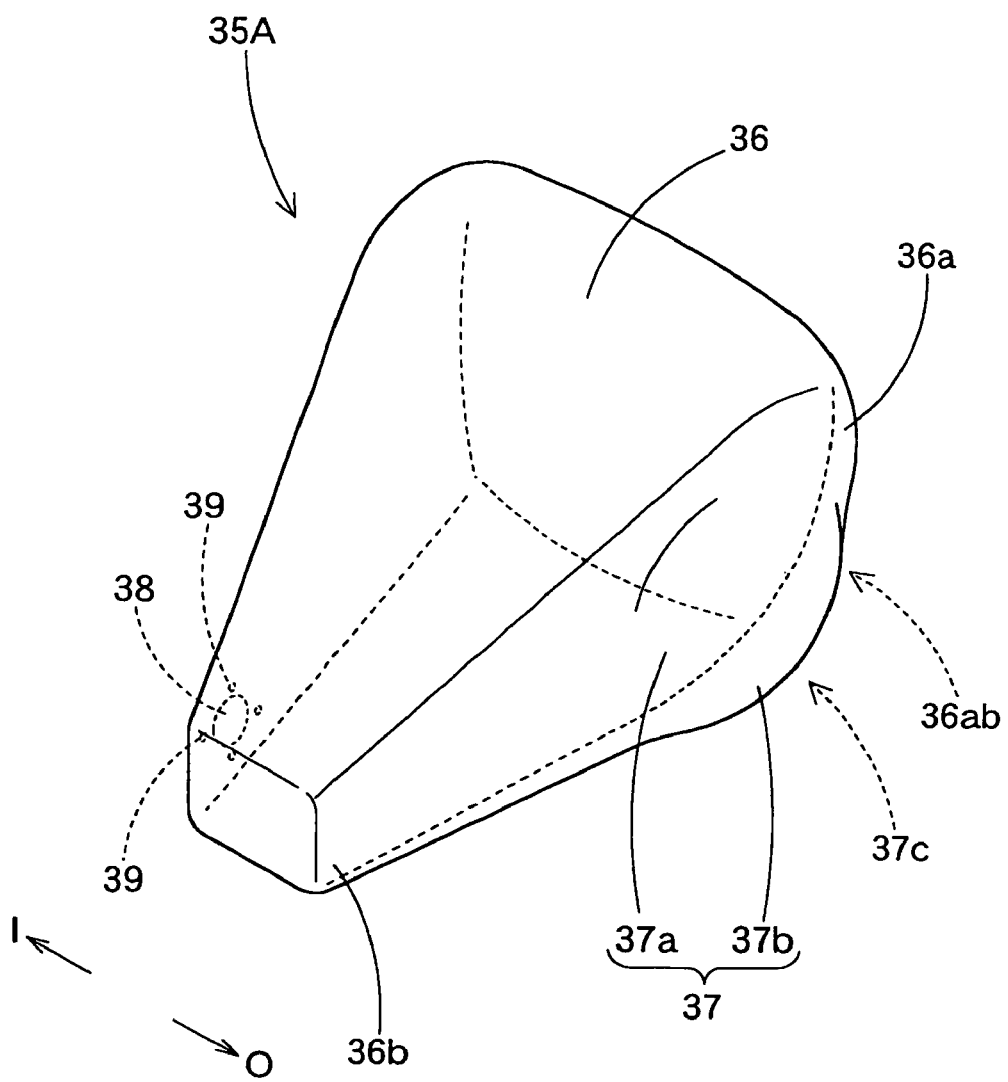
FIG. 11 is a perspective view showing a completely inflated condition of the air bag alone which is used for the air bag system of the second embodiment.
Figure 12:
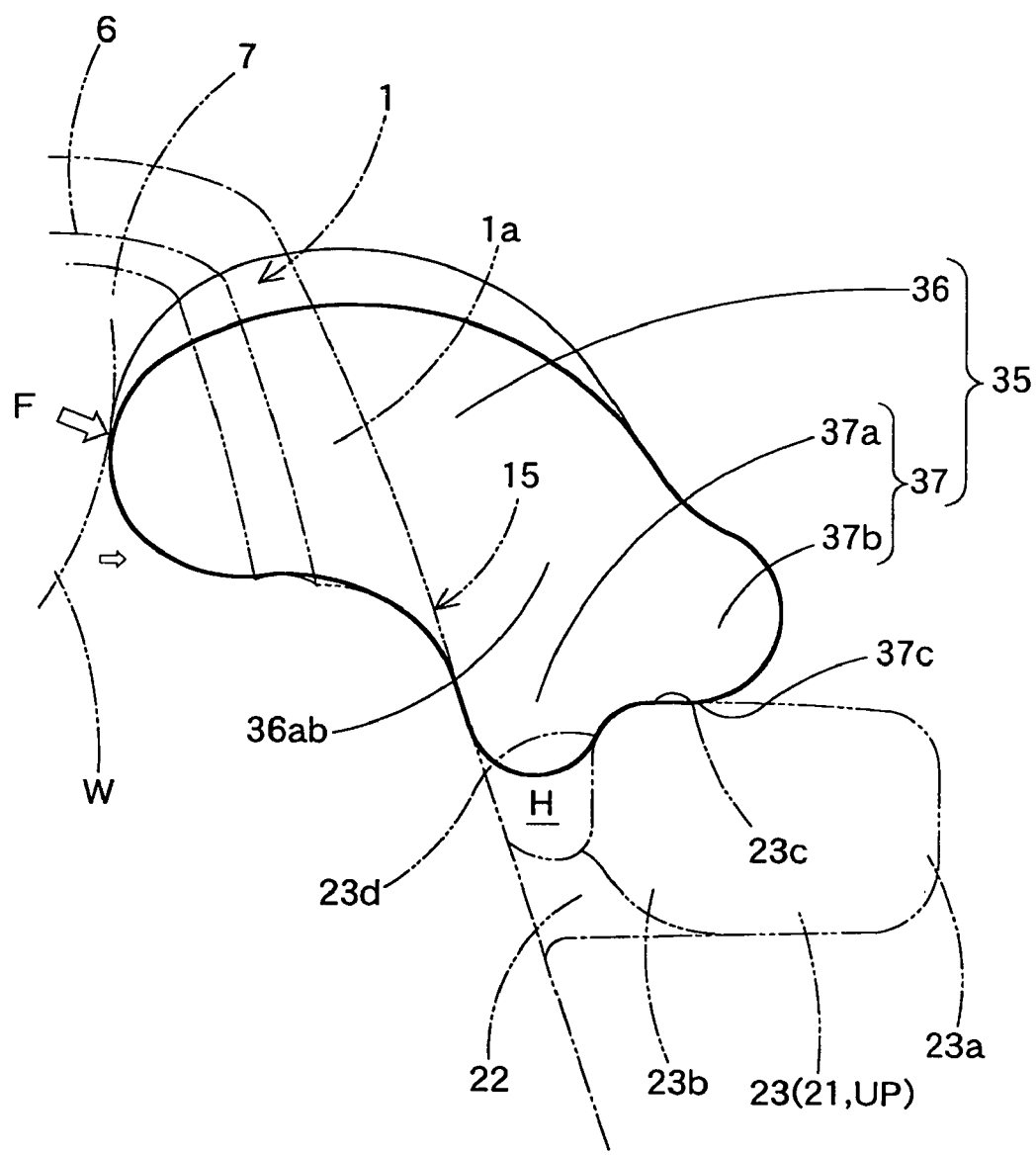
FIG. 12 is a schematic vertical sectional view of the air bag which is inflated when the air bag system of the second embodiment is activated which is taken along a left-right direction in proximity to a door mirror.

While the air bag 35A of the second embodiment is substantially similar to the air bag 35 of the first embodiment, due to the stowage portion 26A being positioned above a belt line 16, the air bag 35A of the second embodiment differs from the air bag 35 of the first embodiment in that an opening 38 into which a main body 31a of the inflator 31 and mounting holes 39 provided on a periphery of the opening 38 so that respective bolts 32a of the retainer 32 are inserted therethrough are shifted further forwards and downwards than those of the first embodiment (refer to FIG. 11). The other configurations of the air bag 35A are similar to those of the air bag 35 of the first embodiment, and the air bag 35A includes, as is shown in FIGS. 1, 11, 12, an inflatable main body portion 36 which covers a front surface 1a of the front pillar 1 and a supporting inflatable portion 37 which stretches continuously from the inflatable main body portion 36 so as to extend towards the outside of the vehicle O from the inflatable main body portion 36. Similar to the first embodiment, the supporting inflatable portion 37 is also disposed to extend towards the outside of the vehicle O from a position on an upper end 36a side of the inflatable main body portion 36 which lies in proximity to an end of a lower edge 36ab on the outside of the vehicle O, when the air bag 35A is inflated completely after the air bag system M2 is installed in the vehicle V. Thus, when the air bag 35A is inflated completely, the supporting inflatable portion 37 is brought into abutment with the upper surface 23c of the mirror main body 23 in a usable position UP at a lower surface 37c thereof so as to support the inflatable main body portion 36. Further, this supporting inflatable portion 37 also includes an inner portion 37a which lies on an inside of the vehicle I which lies close to the inflatable main body portion 36 and an outer portion 37b which lies on the outside of the vehicle O. With the portion which abuts the upper surface 23c of the mirror main body 23 so as to be supported thereon referred to as the outer portion 37c, the supporting inflatable portion 37 is set to fit the inner portion 37a in a gap H defined between a door glass 15 of a side window 14 and the mirror main body 23.

Also in the air bag system M2 of the second embodiment, when the inflator 31 is activated by a signal from an air bag activation circuit after the air bag system M2 is installed in the vehicle V, an inflation gas is discharged from gas outlet ports 31b of the inflator 31, and as is shown in FIGS. 1, 11, 12, the air bag 35A is inflated by the inflation gas and push opens the air bag cover 28A (the door portion 29A). The air bag 35A is then deployed to be inflated while being directed from a lower end 1b side of the front pillar 1 on the stowage portion 26A side towards an upper end 1c side thereof with the inflatable main body portion 36 covering the front surface 1a of the front pillar 1 and the supporting inflatable portion 37 which stretches continuously from the inflatable main body portion 36 so as to extend towards the outside of the vehicle O from the inflatable main body portion 36 brought into abutment with the upper surface 23c of the mirror main body 23 so as to be supported thereon, thereby making it possible to obtain the same function and advantage as those obtained by the first embodiment.

In the case of the second embodiment, the air bag 35A is stowed in the portion of the body BD of the vehicle V, which increases the degree of freedom in layout of the inflator 31 for supplying the inflation gas into the air bag 35A, thereby making it possible to fixedly dispose the inflator in a stable fashion.

Incidentally, although the air bag 35 is stowed in the front side door 13 in the first embodiment, the mounting area 25 of the air bag system M1 is referred to as the area of the mount base 22 of the door mirror 21 (specifically speaking, the front side of the pivotally supporting portion 22a of the mount base 22), and this portion constitutes an area where a stowage space for the air bag system M1 can easily be secured. Thus, the air bag system M1 can be stowed smoothly without affecting an installation space for other installation components of the front side door 13.

What is claimed is:

1. An air bag system mountable on a vehicle, comprising:
an air bag capable of covering a front surface side of a front pillar of the vehicle, the vehicle being provided with a front side door located behind the front pillar, the front side door being adjacent the pillar, the front side door having a side window positioned at a rear of the front pillar and a door mirror positioned in the vicinity of a front lower corner of the side window, the door mirror comprising a mount base which is mounted on the front side door and a mirror main body which is installed while being supported rotatably on the mount base at a proximal portion side thereof so as to be positioned in a foldable position where a distal end is positioned in proximity to the side window and a usable position where the distal end is positioned so as to project towards an outside of the vehicle,
wherein the air bag is folded to be stowed in proximity to a front of the door mirror below the front pillar and comprises:
an inflatable main body portion which covers a front surface of the front pillar when completely inflated;
a supporting inflatable portion which stretches continuously from the inflatable main body portion so as to extend towards the outside of the vehicle from the inflatable main body portion and which is disposed so that a lower surface side is brought into abutment with an upper surface of the door mirror in the usable position so as to be supported thereon to thereby support the inflatable main body portion; and
the air bag is folded and stowed in the front side door in a position which lies in proximity to a front side of the door mirror.

2. An air bag system as set forth in claim 1, wherein
the supporting inflatable portion fits in a gap defined between the mirror main body and the front side door of the vehicle.

3. An air bag system mountable on a vehicle, comprising:
an air bag capable of covering a front surface side of a front pillar of the vehicle, the vehicle being provided with a front side door located behind the front pillar, the front side door being adjacent the pillar, the front side door having a side window positioned at a rear of the front pillar and a door mirror positioned in the vicinity of a front lower corner of the side window, the door mirror comprising a mount base which is mounted on the front side door and a mirror main body which is installed while being supported rotatably on the mount base at a proximal portion side thereof so as to be positioned in a foldable position where a distal end is positioned in proximity to the side window and a usable position where the distal end is positioned so as to project towards an outside of the vehicle,
wherein the air bag is folded to be stowed in proximity to a front of the door mirror below the front pillar and comprises:
an inflatable main body portion which covers a front surface of the front pillar when completely inflated; and
a supporting inflatable portion which stretches continuously from the inflatable main body portion so as to extend towards the outside of the vehicle from the inflatable main body portion and which is disposed so that a lower surface side is brought into abutment with an upper surface of the door mirror in the usable position so as to be supported thereon to thereby support the inflatable main body portion,
wherein the air bag is folded and stowed in a portion of a body of the vehicle which is positioned at a front of the front side door and in proximity to the front side of the door mirror, as viewed from a top plan view of the vehicle,
wherein the air bag is stowed in a panel portion disposed on a left side panel or right side panel of the vehicle.

4. An air bag system as set forth in claim 3, wherein
the supporting inflatable portion fits in a gap defined between the mirror main body and the front side door of the vehicle.

5. An air bag system as set forth in claim 3, wherein the panel portion in which the airbag is to be stowed is disposed to stretch continuously from an outer panel of the front pillar and to a front side of the window frame portion.

6. An air bag system mountable on a vehicle, comprising:
an air bag capable of covering a front surface side of a front pillar of the vehicle, the vehicle being provided with a front side door located behind the front pillar, the front side door being adjacent the pillar, the front side door having a side window positioned at a rear of the front pillar and a door mirror positioned in the vicinity of a front lower corner of the side window, the door mirror comprising a mount base which is mounted on the front side door and a mirror main body which is installed while being supported rotatably on the mount base at a proximal portion side thereof so as to be positioned in a foldable position where a distal end is positioned in proximity to the side window and a usable position where the distal end is positioned so as to project towards an outside of the vehicle,
wherein the air bag is folded to be stowed in proximity to a front of the door mirror below the front pillar and comprises:
an inflatable main body portion which covers a front surface of the front pillar when completely inflated; and
a supporting inflatable portion which stretches continuously from the inflatable main body portion so as to extend towards the outside of the vehicle from the inflatable main body portion and which is disposed so that a lower surface side is brought into abutment with an upper surface of the door mirror in the usable position so as to be supported thereon to thereby support the inflatable main body portion,
wherein the air bag is folded and stowed in a portion of a body of the vehicle which is positioned at a front of the front side door and in proximity to the front side of the door mirror, as viewed from a top plan view of the vehicle, wherein
the airbag is stowed in a panel portion, the air bag being fitted in the panel portion, said panel portion being next to a lower portion of the front pillar at a front side of a frame of the side window of the front side door.

* * * * *